March 10, 1964

J. R. TRENCHARD 3,124,697

VOLTAGE REGULATING ARRANGEMENT

Filed Jan. 23, 1961

INVENTOR.
John R. Trenchard

BY

*C. A. Gulbrandsen*

Atty.

United States Patent Office 3,124,697
Patented Mar. 10, 1964

3,124,697
VOLTAGE REGULATING ARRANGEMENT
John R. Trenchard, Des Plaines, Ill., assignor to Automatic Electric Laboratories, Inc., Northlake, Ill., a corporation of Delaware
Filed Jan. 23, 1961, Ser. No. 84,064
5 Claims. (Cl. 307—51)

This invention relates to a voltage regulating arrangement, and more particularly to apparatus for controlling the supply of power from a current supply source to a load of a type which may itself supply power back to its terminals, at a nominal terminal voltage.

The principal object of this invention is to provide a voltage regulating arrangement which can act as a sink to absorb power from the load, which protects the load from over-voltage, and which maintains good efficiency under all load conditions.

In many electronic systems it is necessary to supply regulated direct-current at various points. At some points the load at times produces direct-current power which must be absorbed by the supply source while maintaining the designated voltage value. For example, transistors acting as switching devices may each have their collector electrode connected through a resistor to a relatively high voltage bias source, and also through a clamping diode to a lower value of direct-current bias. When the transistor is biased to cut-off, power flows from a high-voltage source to an output terminal, and also through the clamping diode to the low-voltage source. This latter voltage is the desired voltage at the output terminal, and should be regulated within close limits. Also, the high-voltage bias is usually of a value great enough to damage the transistor, and the clamping voltage is depended upon for protection. Therefore, if the clamping voltage bias source were used to supply a number of transistors, and its voltage became excessive, the result could be disastrous. This would also be the case if the clamping bias source failed and became open-circuited.

There are also other types of electronic apparatus in which a direct-current supply must at times act as a sink to absorb power from the load. The usual direct-current supply includes unidirectional devices, and therefore current cannot flow in the reverse direction.

One known arrangement includes a Zener diode shunted across the load terminals, using the constant value of the inverse breakdown voltage for regulation. The Zener diode can dissipate the power supplied by the load. However, such diodes as presently available do not have a high enough power dissipation capability for many applications.

The usual voltage regulating arrangement is a series regulator. This is a device which acts as a type of variable resistance which is inserted in series in the regulating circuit between the power supply and the load. The main difficulty with a series voltage regulator is that it requires an external bleeder resistor to function as a power sink, and therefore when there is no loading at the output terminals of the regulator, a great deal of power is wasted.

The invention relates to an arrangement for supplying power from a current supply source to the two terminals of a load of the type which may supply power back to its terminals. It is required that a nominal terminal voltage be maintained, and particularly that over-voltage which would cause damage to the load be prevented. According to the invention, a current sink is provided which comprises a transistor connected in shunt to the load terminals and a control circuit coupled to the load terminals and to the base electrode of the transistor to respond to an over-voltage at the load terminals. This supplies a control signal to the base electrode to reduce the impedance of the transistor. The transistor then draws current from the load terminals so that the terminal voltage is decreased towards its nominal value.

According to a principal feature of the invention, a series regulating device is connected between the current supply source and the load terminals. With this combination good efficiency may be obtained under all load conditions. At no load or sink loading, negligible current is drawn from the source; and at no load or source loading conditions negligible current need be drawn by the shunt transistor as long as the load voltage does not exceed the nominal value.

The above-mentioned and other objects and features of this invention and the manner of obtaining them will become more apparent and the invention itself will best be understood, by reference to the following description of an embodiment taken in conjunction with the accompanying drawings comprising FIGURES 1 and 2, wherein.

Figure 1:
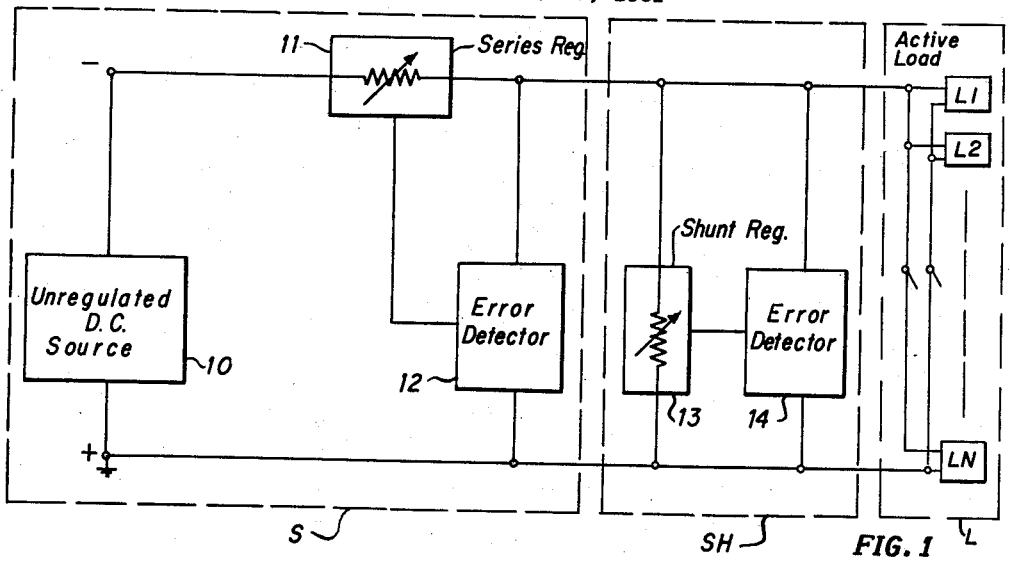
FIG. 1 is a block diagram of the voltage regulating circuit.

Referring now to FIG. 1 of the drawing, there is shown a circuit for supplying current from an unregulated direct-current supply source 10 or any other direct-current supply source to a load L comprising circuits L1–LN through a circuit comprising a series regulator 11 in series with a current path connecting the negative load terminal and the negative terminal of the unregulated direct-current supply source 10. An error detector 12 is connected to the series regulator 11 and is also connected across the load L. This device detects any voltage variation and controls the regulating device 11 so as to maintain the nominal value. The source 10, device 11, and detector 12 form a series regulated supply S. Arrangements of this type are disclosed in Hunter, L. P.: "Handbook of Semi-Conductor Electronics," McGraw-Hill Book Company, Inc., New York, 1956.

Variation in voltage from the nominal value supplied by the unregulated direct-current supply source 10 will also be detected by another error detector 14 which is shunted across the load L as well as being connected to a shunt regulating element 13 also shunted across the load L. The arrangement SH comprising the shunt regulating element 13 and the error detector 14 also has the characteristic of being able to act as a current sink. As a result, any power supplied back to the load terminals by the load L at a nominal terminal voltage will be absorbed by the current sink device. This in turn decreases the excessive supply voltage originating in the power supply source 10 thus protecting any electronic equipment in the circuit from physical damage due to over-voltage. This circuit arrangement is, therefore, provided to control the supply of current from the power supply source 10 to the load L in response to load voltage changes.

Figure 2:
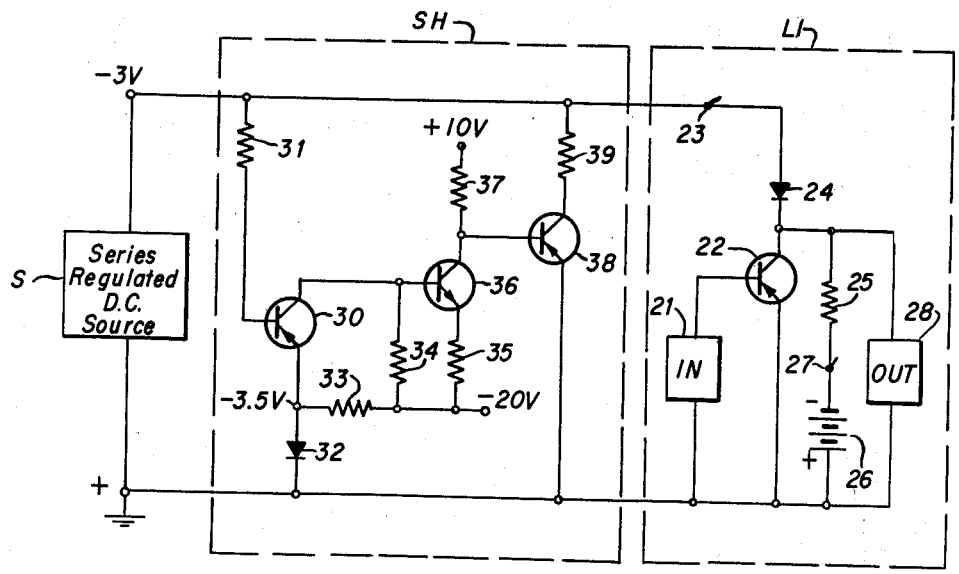
FIG. 2 is a schematic diagram of the voltage regulating circuit embodying the invention.

In the voltage regulating circuit of FIG. 2, current is supplied from a series regulated direct-current source S to a load L through a circuit connecting the negative terminal of the series regulated direct-current source S to the negative load terminal and connecting the positive terminal of the series regulator direct-current source to the positive load terminal. In the shunt regulating circuit there are transistors 30 and 38, each of the p-n-p type, and a transistor 36 of the n-p-n type. A Zener diode 32 and a resistor 33 are combined to provide a reference voltage slightly greater than the voltage provided by the nominal value of the series regulated direct-current source S. This reference voltage appears at the emitter of reference voltage 30 as a result of the voltage divider action of the combined Zener diode 32 and resistor 33.

Resistor 31 is connected from the negative terminal 23 to the base of the transistor 30. Normally transistor 30 is cut-off, since the reference voltage is slightly higher than the power supply voltage. Therefore, the collector of transistor 30, and the base of transistor 36 will be at a constant voltage value of —20 volts. This voltage is substantially higher than the reference voltage or supply voltage. Resistor 35 also connects the emitter of transistor 36 to the —20 volt source. As a result, transistor 36 is cut-off at this time. The collector of transistor 36 is at a voltage of +10 volts through its resistor 37. Therefore, transistor 38 is cut-off at this time also. The collector of transistor 38 is at the series regulated direct-current source supply potential, through resistor 39.

If the voltage across the load should exceed its nominal value thus rising above the reference voltage, transistor 30 will conduct. Its collector voltage will approach the reference voltage, thus causing transistor 36 to conduct. Now the collector voltage of transistor 36 will approach its emitter voltage which in turn causes transistor 38 to conduct. This draws current through the series regulating device. The collector of transistor 38 is returned to the grounded power supply voltage through resistor 39 which has a very low value. Therefore, this action causes the voltage to be reduced to its nominal value, resulting in voltage regulation guarding against over-voltage, thus protecting any electronic equipment in the circuit from physical damage.

In electronic switching systems, transistors are used as switching elements in many circuits, such as in flip flops, in certain types of logical gates, in inverter amplifiers, and other such circuits. In the load L1 of FIG. 2 a transistor 22 is shown in a typical switching circuit. In the circuit shown here the true or "1" signal is a negative potential, and the false or "0" signal is ground potential. The block 21 represents a similar preceding switching stage or other source of digital signals; and the block 28 represents a subsequent switching stage or other load. The principal direct-current voltage supply for the switching transistors is supplied from the negative terminal 27 of a direct-current source 26. The collector electrode of transistor 22 is connected through a bias resistor 25 to terminal 27, to the output 28, and through a clamping diode to the terminal 23. If the input signal supplied from unit 21 to the base electrode of transistor 22 is true, the negative potential biases the transistor 22 into saturation and thereby brings its collector electrode to ground potential. Therefore the output signal to unit 28 is false. In this condition the clamping diode 24 is reverse biased and no current is drawn from the supply S. When the input signal to the base electrode of transistor 22 becomes false, the ground potential biases the transistor into cut-off. Current is then drawn from source 26 through resistor 25 and supplied to the output 28. To provide a fast rise time the potential of source 26 is made substantially greater than the desired output value, and the collector electrode of transistor 22 is clamped through diode 24 to a separate source S at the desired potential. The voltage of source 26 may be high enough to damage the transistor 22. Therefore it is important that whenever the source 26 is on, that the clamping voltage at terminal 23 is also supplied and not be permitted to exceed the designated value. The supply S may be connected in multiple at terminal 23 to several clamping diodes of individual transistor switches.

It is thus clear that any one of the transistors 22 which is biased to cut-off is supplying power through its clamping diode 24 to the terminal 23 of the source S. A sink must be provided to absorb this power. According to the invention this sink is provided by the transistor 38 in the regulating unit SH. The power flowing from terminal 23 causes the voltage to rise, which in turn causes the regulator to lower the resistance of transistor 38, thereby reducing the voltage drop through the resistor 39 and transistor 38.

When there is no load at terminal 23 to ground, or power is being drawn from the series regulated source S, and the voltage is at the correct nominal value, negligible power is drawn by the unit SH. Therefore the efficiency under these conditions is very good.

While I have described above the principles of my invention in connection with specific apparatus, it is to be clearly understood that this description is made only by way of example and not as a limitation to the scope of my invention.

What is claimed is:

1. In combination with a utilization circuit arrangement having a pair of terminals coupled to a first direct-current supply source, with means included in the utilization circuit arrangement to selectively couple a second direct-current supply source to said terminals by way of circuit elements, with the poles of like polarity of the two said direct-current supply sources coupled respectively to the same terminals of said pair, the second direct-current supply source having a potential greater than that of the first direct-current supply source, there being effectively a high series impedance on the first-supply-source sides of said terminals to current flowing in a reverse direction corresponding to a transfer of power from the second direct-current supply source toward the first direct-current supply source so that in response to the coupling by the utilization circuit arrangement of the second direct-current supply source to said terminals the potential at said terminals tends to rise above said nominal value;

apparatus comprising variable impedance means connected in shunt across said terminals, and control means connected to sense the shunt potential across said terminals and in response to an increase in said potential above said nominal value to supply a control signal to reduce the impedance of the variable impedance means, thereby to absorb power and to decrease the potential at said terminals towards said nominal value, irrespective of whether the cause of the potential rise and the source of the power is the first supply source, or the utilization circuit arrangement has coupled the second supply source to cause the current to reverse and power to flow from the second supply source through said circuit elements to said terminals; the only control sensing means between said first direct-current supply source and said terminals being elements in circuits connected in shunt across said terminals.

2. The combination as claimed in claim 1, further including a series regulating device having a series variable impedance means connected in series entirely between said first direct-current supply source and the said variable impedance means connected in shunt across said terminals, at least a part of said high series impedance to reverse current flow on the first supply source side of said terminals being that produced by said series variable impedance means.

3. The combination as claimed in claim 2, wherein said apparatus includes a transistor having a base electrode and an emitter-collector path, wherein said variable impedance means connected in shunt across said terminals comprises a resistor in series with said emitter-collector path of the transistor, and said control means includes a connection to the said base electrode of the transistor;

and wherein in response to the voltage at said terminals being at said nominal value, said control means biases said transistor to a high impedance state so that it draws negligible current.

4. The combination as claimed in claim 3, wherein said means and circuit elements included in the utilization circuit arrangement to selectively couple the second direct-current supply source to said terminals includes a clamping diode with a given point of the utilization circuit arrangement connected through said diode to a first one of said terminals, said diode being poled to be forward biased when the potential at said given point is greater than that of said first terminal with respect to the other one of said terminals, said first terminal being coupled to the pole of a given polarity of the first direct-current supply source; a load resistor connecting the pole of said given polarity of the second direct-current supply source to said given point; a load transistor having collector, base and emitter electrodes, with the collector electrode connected to said given point, the emitter electrode connected to said other terminal, and the base electrode connected to a control source, so constructed and arranged that the transistor varies between a low impedance value to effectively shunt said given point to said other terminal and a high impedance value;

whereby with said load transistor at said high impedance value the second direct-current supply source is coupled to said terminals by way of said load resistor and diode to produce the current flowing in a reverse direction corresponding to a transfer of power from the second direct-current supply source toward the first direct-current supply source.

5. The combination as claimed in claim 4, wherein said utilization circuit arrangement has a plurality of said given points and corresponding diodes, load transistors, and load resistors individually connected thereto.

References Cited in the file of this patent

UNITED STATES PATENTS

| | | |
|---|---|---|
| 2,912,638 | McNamee | Nov. 10, 1959 |
| 2,917,700 | Chase | Dec. 15, 1959 |